(12) United States Patent
Haines

(10) Patent No.: US 6,690,769 B2
(45) Date of Patent: Feb. 10, 2004

(54) HAND-HELD TELECOMMUNICATION LOOP TESTING DEVICE

(75) Inventor: Robert H. Haines, Fort Lee, NJ (US)

(73) Assignee: Telesector Resource Group, Inc., New York, NY (US)

( * ) Notice: Subject to any disclaimer, the term of this patent is extended or adjusted under 35 U.S.C. 154(b) by 84 days.

(21) Appl. No.: 09/792,849

(22) Filed: Feb. 24, 2001

(65) Prior Publication Data

US 2002/0150217 A1 Oct. 17, 2002

(51) Int. Cl.[7] ............................. H04M 1/24; H04M 3/08
(52) U.S. Cl. .................. 379/22.02; 379/1.01; 379/1.04; 379/21; 379/22.08; 379/24
(58) Field of Search ................................ 379/1.01, 1.04, 379/21, 22, 22.01, 22.02, 22.03, 22.08, 24, 27.01, 27.02, 27.03, 27.08, 29.01, 29.1, 31, 1.03, 9; 370/241, 242, 249, 250, 251, 252; 375/133, 144; 324/500, 501, 519, 527, 532, 533, 534

(56) References Cited

U.S. PATENT DOCUMENTS

| | | | | |
|---|---|---|---|---|
| 4,685,065 A | * | 8/1987 | Braun et al. ................. 364/485 |
| 4,870,675 A | * | 9/1989 | Fuller et al. ............. 379/22.01 |
| 5,475,315 A | * | 12/1995 | Cabot .......................... 324/628 |
| 5,909,660 A | | 6/1999 | Foote ............................ 702/189 |
| 5,910,905 A | | 6/1999 | Qian et al. ............. 364/724.08 |
| 6,055,297 A | * | 4/2000 | Terry ......................... 379/1.01 |
| 6,067,353 A | | 5/2000 | Szeliga .................... 379/93.35 |
| 6,091,713 A | * | 7/2000 | Lechleider et al. ......... 370/248 |
| 6,144,721 A | | 11/2000 | Stephens ...................... 379/21 |
| 6,163,594 A | | 12/2000 | Kennedy et al. .............. 379/21 |
| 6,177,801 B1 | * | 1/2001 | Chong ......................... 324/520 |
| 6,215,855 B1 | * | 4/2001 | Schneider .................... 379/22 |
| 6,282,265 B1 | * | 8/2001 | Lowell et al. ................. 379/25 |
| 6,298,144 B1 | * | 10/2001 | Pucker, II et al. .......... 382/103 |
| 6,317,495 B1 | * | 11/2001 | Gaikwad et al. ........... 379/417 |
| 6,456,694 B1 | * | 9/2002 | Posthuma .................. 379/1.04 |
| 6,531,879 B1 | * | 3/2003 | Nero, Jr. .................... 379/1.04 |

* cited by examiner

*Primary Examiner*—Curtis Kuntz
*Assistant Examiner*—Quoc D Tran
(74) *Attorney, Agent, or Firm*—Leonard C. Suchyta, Esq.; Naren Chaganti, Esq.

(57) ABSTRACT

A signal acquisition device captures signals from a telecommunication line such as a local loop. The captured signals are spectrally analyzed using a signal-processing unit. The output of the signal-processing unit—in the form of a test spectrum—is provided to a signal identification system. The signal identification system comprises at least one of a plurality of spectra of known signals stored as templates. Using a matching algorithm, the spectrum of the test signal (unknown signal) is correlated with spectra of at least two known signals. The unknown signal is determined to be the same type as that of the known signal with whose spectrum the unknown signal produces the largest absolute correlation score. Alternatively, an unknown signals is determined to be that of a known signal if a correlation of both signals results in a score the absolute value of which is greater or equal to a predetermined threshold level. Algorithms such as Chi-Square Test, the Kolmogorov-Smirnov test, and the Cross Correlation test could be used to determine if the unknown signal and the templates are correlated.

31 Claims, 3 Drawing Sheets

HAND-HELD TELECOMMUNICATION LOOP TESTING DEVICE

TECHNICAL FIELD

The system disclosed herein is related generally to devices that are used in testing and identifying signals in a telecommunication line, and, particularly, to a hand-held spectrum analyzer used in testing and identifying signals such as Digital Subscriber Line (DSL) signals and their interferers.

BACKGROUND

Traditionally, scientists, engineers and trouble-shooting technicians have used test devices to identify the type of signals in a telecommunication line. Local loop analysis typically involves the detection of the types of signals in a customer's line, and then detecting if any faults occur in the line. Identifying faults, interfering signals or stray frequencies present in a telecommunication line requires the detection of these faults, interfering signals or stray frequencies so as to allow a technician to take an appropriate action. Numerous devices are in the market to allow analysis of the local area network (LAN) or wide area network (WAN) protocols. The product TTC™ FIREBERD marketed by Acterna Corporation of Germantown, Md. is an example of a device that can be used to analyze LAN/WAN signals.

The availability of miniaturization technologies such as the Personal Computer Memory Card International Association (PCMCIA) technologies makes it feasible to build portable test and analysis equipment to dynamically analyze telephony signals such as DSL signals using a hand-held computer. Further, though numerous devices are designed to identify and classify the type of signal in a local loop, no known device uses templates of known signal characteristics to match a known signal with an unknown signal, or to identify interfering or stray signals in a telecommunication line. Therefore, there is a need for an improvement in the art.

SUMMARY

For purposes of this application, the word "match" (or any derivative of the word) should be understood as follows.

In a first definition, the word "match" is defined as follows: Where an unknown signal spectrum is correlated with several templates of known signal types, the unknown signal is said to have "matched" that known signal for which the correlation results in the largest (absolute) value.

In a second definition, the word "match" is defined as follows. If, upon correlating an unknown signal spectrum with a single known signal template, the absolute value of the correlation between the two signals is at or above a predetermined threshold level, then the two signals are deemed to match.

The correlation may be performed using the Cross Correlation Test, the Chi-Square Test, or the Kolmogorov-Smirnov Test, which are described in Donald Knuth, "The Art of Computer Programming" (Addison-Wesley, Pub., 1969). In alternative embodiments, any goodness-of-fit tests may be used to determine whether the signals are correlated.

In one aspect, the present disclosure is directed toward a hand-held spectrum analyzer. A hand-held computer, configured to fit in a person's hand or a person's shirt pocket, is programmed to perform signal processing and signal identification functions in one integrated unit. The hand-held spectrum analyzer may be configured to identify an unknown signal in a telecommunication line. The hand-held computer comprises, in one embodiment, an output device such as a flat-panel display screen or an audio output device.

In an embodiment of the disclosed method, a signal acquisition device captures signals from a telecommunication line such as a local loop. The captured signals are spectrally analyzed using a signal-processing unit. The output of the signal-processing unit—in the form of an unknown signal spectrum—is provided to a control unit comprising a signal identification system. This signal identification system could be a computer such as a programmed general-purpose computer.

A technician uses a device configured consistent with the principles disclosed herein to distinguish between the several types of signals and may then be able to determine if the signal pattern in the line matched a T-1 signal, an ADSL signal, an ISDN signal, or any other known signal whose template matches the unknown signal in accordance with a correlation function.

In another aspect, a method and apparatus consistent with the presently disclosed principles analyzes a telecommunication line such as a Plain Old Telephone System (POTS) line to identify unwanted or unknown signals that occur on the line. In case there is detected any unwanted or unknown signal, the disclosed system determines if any interfering signals are present in the telecommunication line. If interfering or unknown signals are present in the telecommunication line, a technician may identify such signals by matching the unknown signal with any known signal template(s). Alternatively, a technician may identify a stray frequency or interfering signal by visually determining the stray frequency or interfering signal according to an aspect of the disclosed method. This method includes the step of grouping frequencies that are adjacent to one another by a predetermined frequency points. If the interfering or unknown signal cannot be identified, the technician uses the device disclosed herein to isolate and quantify the stray frequency (if narrow band) or compares with stored signal templates for identification (if wideband). After the technician identifies the stray frequency or interfering signal, it can be stored temporarily or permanently in a storage device. The stored template could then be used—during the matching step—at a later time to determine if the unknown signal recurs at the same or at a different location.

Two stages of signal identification are possible. A first stage allows a technician to determine if the signal is a narrow band signal or a broadband signal by visually inspecting the result of a filtering function displayed on the hand-held computer flat-panel display screen, or audio output device.

In a second stage, the signal identification system comprises at least one of a plurality of spectra of known signals stored as templates. Using a matching algorithm, the spectrum of the test signal (unknown signal) is correlated with spectra of several known signals. The unknown signal is determined to be the same type as that of the known signal with whose spectrum the unknown signal produces the highest absolute correlation score. Algorithms such as Chi-Square Test, the Kolmogorov-Smirnov test, and the Cross Correlation test may be used to perform correlation operations.

BRIEF DESCRIPTION OF THE DRAWINGS

These and other features, objects and advantages can be more readily understood from the following detailed description and the accompanying drawings, where like numerals indicate like parts throughout the several views, and wherein.

DETAILED DESCRIPTION

Figure 1:
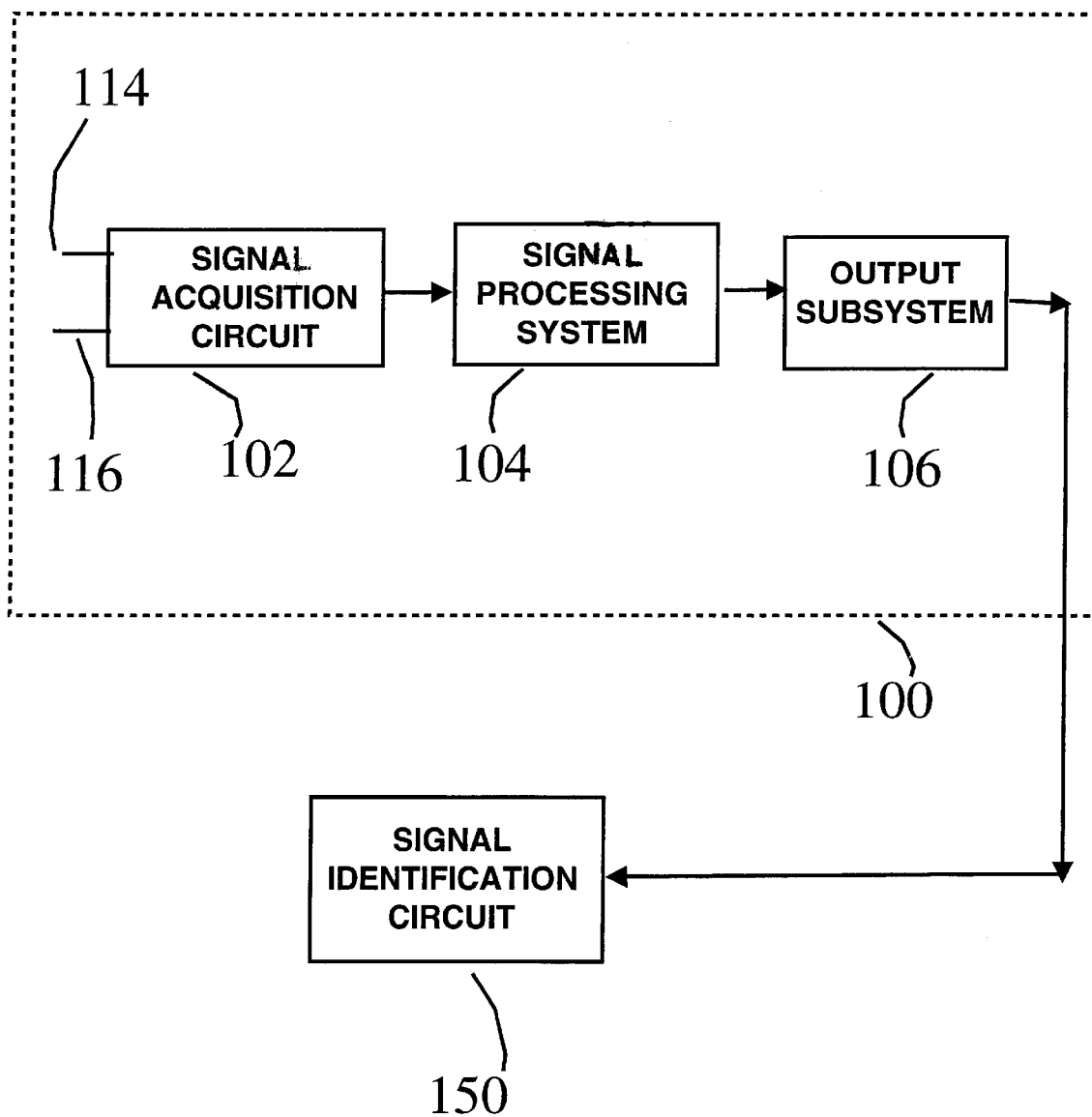
FIG. 1 shows the architecture of the hardware in which the principles of the disclosed method may be practiced.

Referring to FIG. 1, in an embodiment, an illustrative architecture to implement the presently invented system includes a first stage comprising an analyzer circuit 100, and a second stage, which is a signal identification circuit 150.

The analyzer circuit 100 comprises a signal acquisition system 102; a signal processing system 104 coupled to the signal acquisition system 102, and an output subsystem 106. The signal acquisition system 102 further comprises a system for receiving or inputting a telecommunication signal from a line such as a telecommunication subscriber's line, and comprises ports for tip 114, ring 116 and ground (not shown in FIG. 1). In an embodiment, the second stage comprises a hand-held computer.

The analyzer 100 receives the signal from a telecommunication loop such as a customer line, performs signal analysis, and presents a frequency spectrum of the signal to the signal identification circuit 150, which matches the frequency spectrum of the input signal with stored templates of known spectra to determine the type of signal present in the customer's line.

Figure 2:
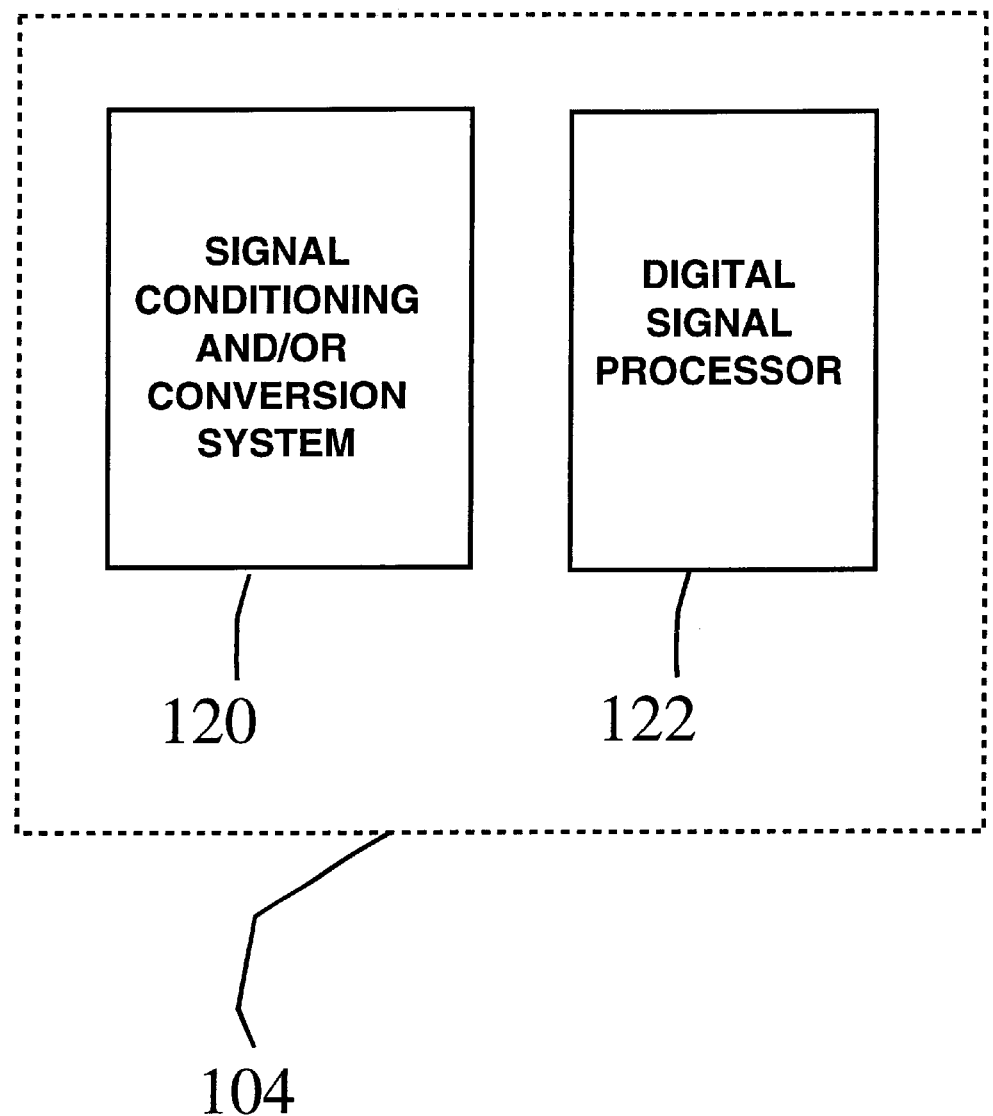
FIG. 2 depicts a more detailed view of a signal processing system shown in FIG. 1.

Referring to FIG. 2, the signal processing system 104 receives the acquired signal and suitably transformed—attenuated, amplified or buffered—by the signal acquisition system 102, and provides the transformed signal to a signal conditioning and/or signal conversion circuit 120. The signal conditioning and/or conversion circuit 120 performs operations such as analog-to-digital conversion (the circuits for which are not shown) and provide the converted or conditioned signal to a digital signal processor (DSP) 122, which could be a programmed DSP chip such as one available commercially from Texas Instruments, Inc. of Austin, Tex.

Also a part of the signal processing system is a memory device such as semiconductor memory (e.g., a Random Access Memory, a Read Only Memory, or an Erasable and Programmable Read Only Memory) (not shown in FIG. 2) in which are stored instructions and/or data to be used by the DSP 122. The DSP 122 is programmed to execute the instructions stored in the memory device, and in accordance with the instructions, transform the input signal from a time domain to a frequency domain and obtain a frequency spectrum (i.e., spectral energy at different frequency points) of the input signal.

It should be noted that the analyzer circuit may include other electronic components such as a power supply unit, analog-to-digital or digital-to-analog converters, relays, switches, signal transformers, amplifiers, attenuators, voltage and/or current dividers, transistors, vacuum tubes, diodes, resistors, impedances, capacitors, and other electronic elements used for rectification, circuit protection, impedance-matching circuits, and voltage and/or current regulating devices, which devices are not shown in FIG. 1, but are contemplated in a commercial version of the disclosed method.

In alternative embodiments, the DSP 122 may be replaced with a programmed general purpose microprocessor executing software to perform signal processing operations; a suitably programmed Application-Specific Integrated Circuit (ASIC) or a collection of discrete electronic components such as resistors, inductors, capacitors, and/or integrated circuits (e.g., gates) suitably arranged on a semiconductor chip (e.g., field-programmable gate arrays); or a printed circuit board with electronic devices suitably arranged to achieve the function described herein. In another embodiment, the analyzer circuit may be a commercially available product such as the HP 4395™ Network/Spectrum Analyzer marketed by the Agilent Corporation of Palo Alto, Calif. Other suppliers of spectrum analyzers that could be used in conjunction with the presently disclosed method include Tektronix, Inc. of Beaverton, Oreg., the Acterna Corporation of Germantown, Md., and others. A suitably formatted portion of the output of the HP 4395™ spectrum analyzer may be input to the signal identification circuit 150 to practice the principles of the method described herein.

As shown in FIG. 1, the output subsystem 106 receives the frequency spectrum of the transformed input signal and, transmits or makes available to the signal identification circuit 150 for additional processing. The output subsystem 106 may be configured to provide the frequency spectrum of the transformed input signal either responsive to a request in any method such as via a polling mechanism, via an Application Programming Interface (API), in response to a remote procedure call, a request via an inter-process communication mechanism, a network request received at a Transmission Control Protocol/Internet Protocol (TCP/IP) socket, a wireless connection, or the like.

The signal identification circuit 150 is illustratively a programmed general-purpose computer comprising a general-purpose microprocessor such as the Pentium® III microprocessor acting as a central processing unit (CPU), which is coupled to other units via a system bus. Other processors that can function as the CPU are Power PC™ microprocessor, MIPS™ processor, SPARC™ processor, PA-RISC™ processor or the Motorola 68000™ series microprocessor. Many other processors are also available. The functional elements of the signal identification circuit 150 communicate with each other via the system bus. Also optionally coupled to the system bus are a memory device such as semiconductor memory, a storage device such as disk drive, an input device such as a keyboard, a joystick, a pointer device such as a mouse, and an output device such as a flat-panel display or a CRT. These optional devices are used in alternative embodiments, and all of these devices may not be needed to implement the principles disclosed herein.

It should be noted that though in an embodiment, the signal identification circuit 150 is comprised of a hand-held computer, other illustrative embodiments might use instead of a hand-held computer, a laptop computer, a desktop computer, a workstation, or any other computing device such as a server or a mainframe computer. Moreover, in one embodiment, the present method may be practiced by suitably programming a commercially available subscriber loop analyzer such as the Acterna® T-BERD 109XC Subscriber Loop Analyzer, which is marketed with an integrated personal computer (PC).

A processor such as the above usually executes a program referred to as an operating system, such as the Microsoft Disk Operating System (MS-DOS®), or any one of the various versions of the Windows operating systems such as Windows-CE®, Windows-98®, or Windows-ME®, which are available from the Microsoft Corporation, of Redmond, Wash., Linux™ operating system available from Red Hat corporation of Durham, N.C., Palm® OS available from Palm, Inc., of Santa Clara, Calif., or the UNIX™ operating system available from many vendors such as AT&T of New York, N.Y. The operating system controls the execution of other computer programs such as a graphical user interface (GUI) and provides scheduling, input-output control, file and data management, memory management, and communication control and related services. The processor and the operating system define a computer platform, for which application programs in a programming language such as assembler or a high level language such as the C programming language, FORTRAN, the C++ programming language, the Java programming language, or the like.

OPERATION

Figure 3:
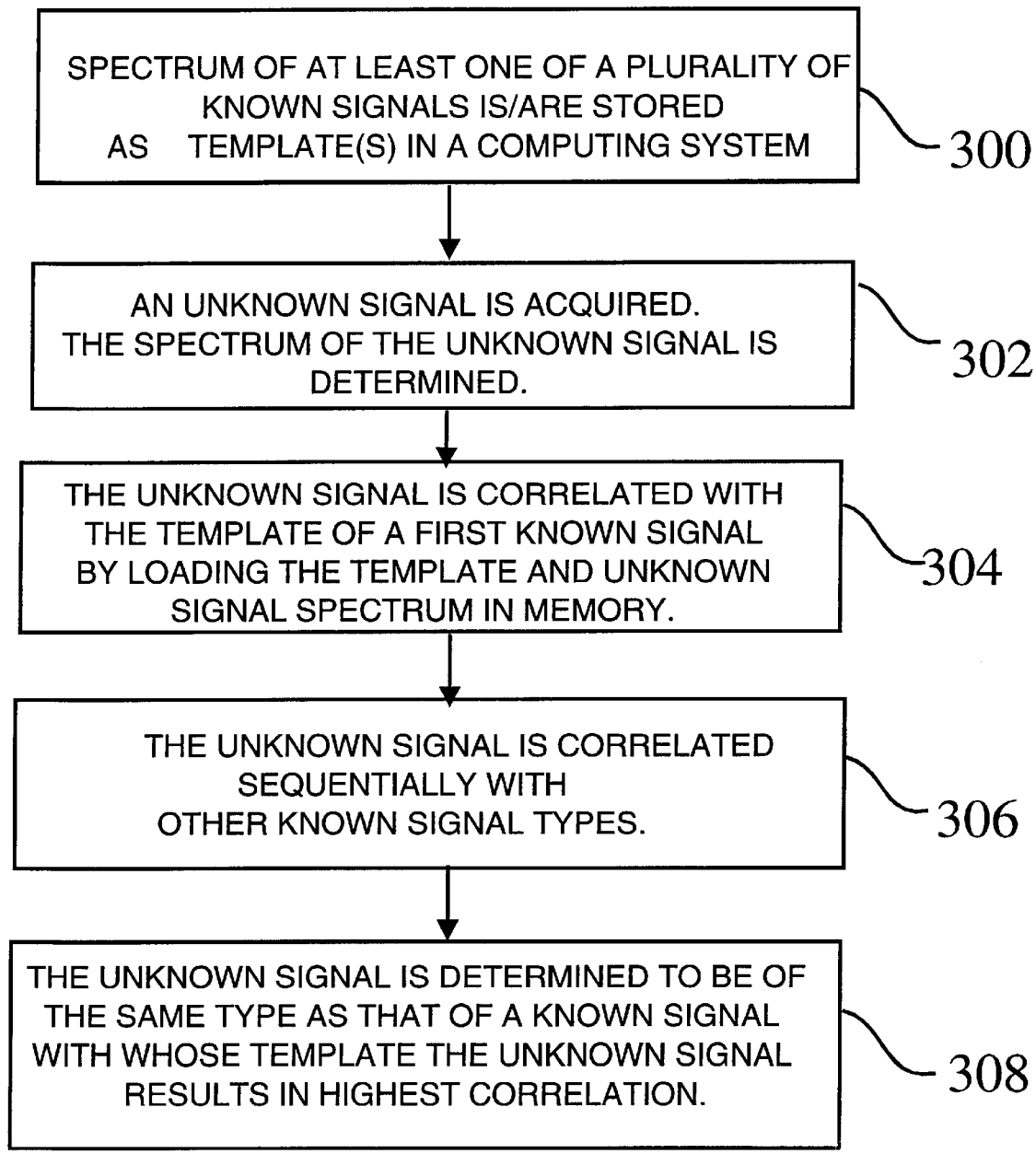
FIG. 3 delineates the steps in accordance with an illustrative embodiment of the method described herein.

Referring now to FIG. 3, during an initialization step (step 300), spectrum of at least one of a plurality of known signals is stored as an ASCII (text) or binary file at a known directory in the signal identification circuit 150. For example, the spectrum of a signal known to be a T-1, ADSL, HDSL, ISDN or other signal type is stored in the hand-held computer. It should be noted that though some signal types, for example, T1, ADSL are used to illustrate the principles of the presently disclosed method, the method should not be limited to these listed illustrative embodiments alone. Instead, it is intended that these principles may have general applicability, and thus other signal types may be substituted for the given signal types.

In an alternative embodiment, this known signal spectrum is energy-normalized and stored in the signal identification circuit 150, and will be compared to an unknown signal spectrum, which is also energy-normalized.

An unknown signal is acquired by inserting the Tip (114) and Ring (116) probes in a telecommunication line (step 302). Alternative embodiments may include other methods of acquiring the unknown signal.

The spectrum of the unknown signal is then correlated with each known signal template. The correlation function may be the Cross Correlation Test, the Chi-Square Test, or the Kolmogorov-Smirnov Test, which are described in Donald Knuth, "The Art of Computer Programming" (Addison-Wesley, Pub, 1969). In alternative embodiments, any goodness-of-fit test may be used to determine whether the two signals are correlated.

Generating Templates of Known Signals

Advantageously, the template files that store spectra of known signals are named in such a way the identification of the signal stored in the template file is easy, for example, the file is named T1.TXT or ADSL.TXT, indicating that the file contains spectrum of either a T-1 signal or an ADSL signal respectively. This stored spectrum is known as a template. In accordance with the invented principles, if an unknown signal spectrum is matched to a known signal spectrum template, then the unknown signal is determined to be of the same type as the known spectrum.

The template for a known signal is generated as follows. A known signal is supplied to the first stage circuit, which is the analyzer circuit 100. The spectrum (i.e., the points describing the frequency spectrum) obtained at the output subsystem 106 is then stored as the template for the known signal type. In an embodiment, the spectrum may be energy-normalized to remove any dc component from the spectrum. Other transformations known to persons of ordinary skill in the art may be performed to the spectrum. By taking an average (i.e., arithmetic mean) of several spectra and storing the mean value as a template, the template may be further refined.

Matching an Unknown Signal with Template

After a number of templates are generated, each for a different signal type, these are stored in a storage area such as a hard disk included in the signal identification circuit 150. It should be noted that a single template is sufficient, but by storing a number of templates, one for a different signal type, the identity of an unknown signal is determined as the template it matches. Thus, the present method may be able to identify an unknown signal type by successively matching the unknown signal spectrum with a number of known signal spectra.

The above is achieved as follows. Initially, a file containing a list of all template files (including their paths, absolute or relative), e.g., T1.TXT, ADSL.TXT, HDSL.TXT, is created, one for each signal type, T-1, ADSL, and HDSL respectively. As stated earlier, this system is not limited to these signal types alone. This file is input to a program that executes the following steps.

During a next step, a first template is loaded into the memory of the signal identification circuit 150 (step 304). A threshold energy level T, e.g., −50 dB, or −20 dB is selected. The threshold T is empirically, heuristically or otherwise determined to be such that noise, e.g., white noise, is below the threshold. Then the unknown signal spectrum is loaded into memory. The resulting signal is used for bandwidth determination.

Then the correlation function is executed between the unknown signal and the known signal template (without employing the threshold T). The absolute value of the result (score) of the correlation function is taken. Other templates are sequentially loaded to memory and the same steps are performed on each template (step 306). The template that results in the highest (absolute value of) correlation result is deemed to be the signal type, and thus, the signal type in the unknown signal is deemed to be the same signal type as that from which that template is created.

As an example, suppose that the correlation function results in scores as shown in the following table.

| Correlation score | Template file used |
|---|---|
| 0.2 | HDSL.txt |
| 0.01 | ISDN.txt |
| 0.5 | T1.txt |
| 0.9 | ADSL.txt |

Based on this example, the unknown signal is highly correlated to an ADSL template, and thus, it is deemed to match the ADSL signal type (step 308).

In another embodiment, if this score (absolute value) is equal to or greater than a predetermined value C (which is determined heuristically, empirically or otherwise), then the unknown signal is deemed to have matched a particular signal template. For example, if the threshold C is 0.89, then only the correlation score for ADSL template exceeds the predetermined threshold value C, and therefore the unknown signal is determined to be an ADSL signal.

Identifying Stray Frequencies in the Unknown Signal Spectrum

When the signal is captured and its spectrum is generated by the output subsystem 106, it may contain some stray frequencies that could hinder the identification of the signal. For example, the unknown signal could be contaminated with a radio frequency signal induced into the telecommunication lines from a nearby broadcast radio station, a ham radio, or a customer premise equipment (CPE) may have induced power frequency and distortion harmonics from power lines. These stray frequencies, if present in the unknown signal spectrum, may cause a misidentification of the unknown signal type. Hence, in an embodiment of the invented system, a filter may be advantageously included before executing the above-described correlation test.

Visually Determining if the Unknown Signal is a Narrow Band or Broadband Signal Another refinement to the invented method of enabling a technician to identify signals includes displaying the bandwidth of the unknown signal. By visually identifying that the unknown signal is a narrow band signal or a broadband signal, a technician may use other methods to further identify the unknown signal. Accordingly, in an embodiment, at each spectral point, the unknown spectrum is compared to a threshold energy level, and if the spectral energy level is greater than the threshold, then that frequency is flagged as "detected." The threshold energy level is determined empirically, heuristically or otherwise. The following pseudo code describes this.

```
LOOP: FROR EACH FREQUENCY I
    IF SPECTRAL ENERGY > THRESHOLD
    THEN
        DETECTED [J] = I;
    J = J+1;
    ENDIF
END LOOP
```

After iterating through all the frequencies in the unknown spectrum, adjacent detected frequencies (which determine the bandwidth of the frequency spectrum above the threshold energy level) are counted as a part of the "bandwidth" and displayed on the display device of the signal identification circuit 150. This "bandwidth" is computed as follows: if, two detected frequencies are separated by a predetermined interval k (k>=1), then all frequency points between the two frequencies are deemed to be detected. The following pseudo code illustrates the computation of the "bandwidth."

```
LET K BE A PREDETERMINED NUMBER <= 1;
LOOP: FOR EACH J
    IF (DETECTED [J + 1] - DETECTED [J]) <= K
    THEN
        BANDWIDTH INCLUDES ALL FREQUENCIES BETWEN
        DETECTED [J] AND DETECTED [J+1];
END
END LOOP
```

Thus, the "bandwidth" comprises clusters of those frequencies at which spectral energy is greater than the threshold energy level. This bandwidth is then displayed on the display device of the signal identification circuit 150. This enables a technician to determine if the unknown signal is a narrow band signal or broadband signal.

The foregoing describes a method of identifying an unknown signal type by comparing the frequency spectrum of the unknown signal with that of a known signal. The method described herein and any modifications, readjustments, rearrangements to the described embodiments, including changing the order of the steps, selecting different threshold energy values, performing some or all of the steps in memory rather than with the usage of a disk storage, and the like. These modifications, readjustments, and rearrangements are, therefore, to be understood as properly within the scope of the appended claims.

What is claimed is:

1. A method for identifying a signal present in a telecommunication line, comprising the steps of:
   inserting a signal acquisition device in a local loop to acquire a first signal, wherein the first signal is an unknown interfering signal;
   obtaining a frequency spectrum of the first signal;
   determining the spectral energy of the first signal from the frequency spectrum;
   at each spectral point, comparing the energy of the unknown interfering signal to a threshold energy level:
   correlating the spectral energy of the first signal with a template of a second signal, where the second signal is a known interfering signal; and
   identifying the first signal as the known signal type if the first signal and the second signal match.

2. The method of claim 1, wherein the correlating step uses a Cross Correlation test.

3. The method of claim 1, wherein the correlating step uses a Chi-Square test.

4. The method of claim 1, wherein the correlating step uses a Kolmogorov-Smirnov test.

5. The method of claim 1, further comprising the step of identifying a stray frequency from the spectrum of the unknown signal.

6. The method of claim 5, wherein the identified stray frequency is frequency induced from a radio station.

7. The method of claim 5, wherein the identified stray frequency is frequency induced from a power line.

8. The method of claim 5, wherein the identified stray frequency is frequency induced from Customer Premise Equipment.

9. The method of claim 1, further comprising the step of visually displaying at least one frequency from the unknown signal on a display device.

10. The method of claim 9, wherein the at least one frequency is a frequency whose spectral energy is greater than a predetermined threshold energy levels.

11. The method of claim 10, wherein the threshold energy level is determined empirically.

12. The method of claim 10, wherein the threshold energy level is determined heuristically.

13. The method of claim 9, wherein the display device is comprised in a hand-held computer.

14. An apparatus for identifying a signal in a telecommunication line, comprising:
   an analyzer circuit comprising:
   a signal acquisition system; and
   a signal processing system electrically coupled to the signal acquisition system; and
   a computing system coupled to the analyzer circuit, said computing system comprising:
   a central processing unit; and
   a memory device;
   whereby when an unknown interfering signal is input to the signal acquisition system, a spectrum of the unknown signal is determined by the signal processing system, whereupon the central processing unit, in accordance with instructions stored in the memory device determines the spectral energy of the unknown interfering signal from the spectrum, compares the energy of the unknown interfering signal to a threshold energy level at each spectral point, and identifies the unknown signal by taking the highest absolute correlation score produced by correlating the spectrum of the unknown interfering signal with the spectra of at least two known interfering signals.

15. The apparatus of claim 14, wherein the unknown signal is matched with the template using a Cross Correlation test.

16. The apparatus of claim 14, wherein the unknown signal is matched with the template using a Chi-Square test.

17. The apparatus of claim 14, wherein the unknown signal is matched wit the template using a Kolmogorov-Smirnov test.

18. The apparatus of claim 14, further comprising a filter to identify a stray frequency from the spectrum of the unknown signal.

19. The apparatus of claim 18, wherein the identified stray frequency is frequency induced from a radio station.

20. The apparatus of claim 18, wherein the identified stray frequency is frequency induced from a power line.

21. The apparatus of claim 18, wherein the identified stray frequency is frequency induced from Customer Premise Equipment.

22. The apparatus of claim 14, further comprising a display device whereby at least one frequency is displayed on the display device.

23. The apparatus of claim 14, wherein teat least one frequency is a frequency whose spectral energy is greater than a predetermined threshold energy level.

24. The apparatus of claim 23, wherein the threshold energy level is determined empirically.

25. The apparatus of claim 23, wherein the threshold energy level is determined heuristically.

26. The apparatus of claim 22, wherein the display device is comprised in a hand-held computer.

27. The apparatus of claim 26, wherein the hand-held computer is configured to fit in a person's shirt pocket.

28. The apparatus of claim 26, wherein the hand-held computer is configured to fit in a person's hand.

29. The method of claim 1, further comprising the step of:
creating a template of a known signal.

30. The method of claim 1, further comprising the step of:
creating a template of a known signal by determining the spectral energy in the known signal.

31. The method of claim 1, further comprising the step of:
storing a copy of the unknown signal in a storage device so that the unknown signal may be used as a template at a later time.

* * * * *